[11] 3,574,467

[72] Inventors T. O. Paine
Administrator of the National Aeronautics and Space Administration in respect to an invention of;
Michael S. Shumate, Pasadena; James A. Westphal, Altadena; Lewis H. Allen, Pasadena, Calif.
[21] Appl. No. 840,359
[22] Filed July 9, 1969
[45] Patented Apr. 13, 1971

[54] METHOD AND APPARATUS FOR ALIGNING A LASER BEAM PROJECTOR
5 Claims, 2 Drawing Figs.
[52] U.S. Cl........................................... 356/153, 331/94.5
[51] Int. Cl............................................G01b 11/27
[50] Field of Search........................................... 356/138, 152, 153; 250/203; 331/94.5; 340/227; 350/81

[56] References Cited
UNITED STATES PATENTS
| | | | |
|---|---|---|---|
| 3,278,753 | 10/1966 | Pitts et al...................... | 331/94.5 |
| 3,326,619 | 6/1967 | Johnson et al................ | 250/203 |
| 3,410,641 | 11/1968 | Bergman....................... | 331/94.5 |
| 3,470,377 | 9/1969 | Le Febre et al............... | 356/138 |
| 3,499,713 | 3/1970 | Ito................................ | 331/94.5 |

FOREIGN PATENTS
| | | | |
|---|---|---|---|
| 963,884 | /1964 | Great Britain................. | 356/153 |
| 425,265 | /1967 | Switzerland.................. | 356/153 |

OTHER REFERENCES
Northend et al., Laser Radar (Lidar) for Meteorological Observations, Review of Sci. Instr., 4/66, Vol. 37, #4, pp. 393-400

Linde Laser Welder, 1964 NASA Tech Brief 68— 10311, Improved Electro-Optical Tracking System, 8/68

*Primary Examiner*—Ronald L. Wibert
*Assistant Examiner*—J. Rothenberg
*Attorneys*—G. T. Mc Coy, J. H. Warden and Monte F. Mott ABSTRACT: A method and apparatus particularly suited for use in aligning an optic system, such as an astronomical telescope, employed as a laser beam projector for projecting a beam of laser light against a celestial target and including therein an arrangement of optically related lenses and mirrors by which light emanating from a celestial target is brought in focus to form an image of the target within the focal plane of the optic system, and characterized by the utilization of a beam splitter having a reflecting surface including a microscopic opening disposed within the path of a projected laser beam, as well as within the path of the light being brought in focus, whereby the laser beam is projected through the optic system toward the target, while the light emanating from the target is brought in focus in the focal plane of the system and then redirected by the reflecting surface of the beam splitter to a second optic system for imaging both the target and the opening formed in the beam splitter for thereby accommodating a visual detection of optical alignment of the system for assuring alignment of the system relative to the target.

PATENTED APR 13 1971

3,574,467

MICHAEL S. SHUMATE
JAMES A. WESTPHAL
LEWIS H. ALLEN
INVENTORS

ATTORNEYS

METHOD AND APPARATUS FOR ALIGNING A LASER BEAM PROJECTOR

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

The instant invention relates to optic systems and more particularly to a method and apparatus for aligning an optic system employed as a laser beam projector.

2. Description of the Prior Art

The prior art is replete with numerous "aiming" devices adapted selectively to direct laser beams toward given targets. Normally these devices are employed in aligning laser beam projector systems for directing laser beams to impinge at specific points located at relatively short distances from the projector. Hence, limited error in beam direction can be tolerated. However, in directing laser beams to impinge at targets such as specific points located on the surfaces of celestial bodies angular deviation in "aiming" becomes quite critical, due to the extended distances through which the beam must be projected to the target. Since relative movement normally occurs between the system and the target, the target must continuously be tracked. The tracking, in turn, requires that continuous precise alignment be achieved between the laser generator, the optic system employed as a laser beam projector, and the target being tracked.

OBJECTS AND SUMMARY OF THE INVENTION

This invention provides a method and apparatus for aligning a laser beam projector including an optic system of a type such as an astronomical telescope, which collimates and projects a laser beam, while simultaneously imaging the target, for achieving a continuous boresighting of the system through the use of a beam splitter disposed in the system's focal plane and having a concentric opening through which the laser beam is projected toward the target being tracked employing the optic system.

Accordingly, an object of the instant invention is to provide an improved method and apparatus for aligning a laser beam projector.

Another object is to provide an improved method for aligning a laser beam projector employing an optic system of a type provided with a very long focal length.

Another object is to provide a method for aligning a laser beam generator and an astronomical telescope utilized as a laser beam projector and a target being tracked in celestial space.

Another object is to provide an apparatus including a beam splitter having a microscopic opening therein for accommodating passage of a laser beam to an astronomical telescope for accommodating a boresighting of the telescope as it is employed in directing a projected laser beam to impinge on a celestial target.

These together with other objects and advantages will become more readily apparent by reference to the following description and claims in light of the accompanying drawing.

DESCRIPTION OF THE PREFERRED EMBODIMENT

Figure 1:
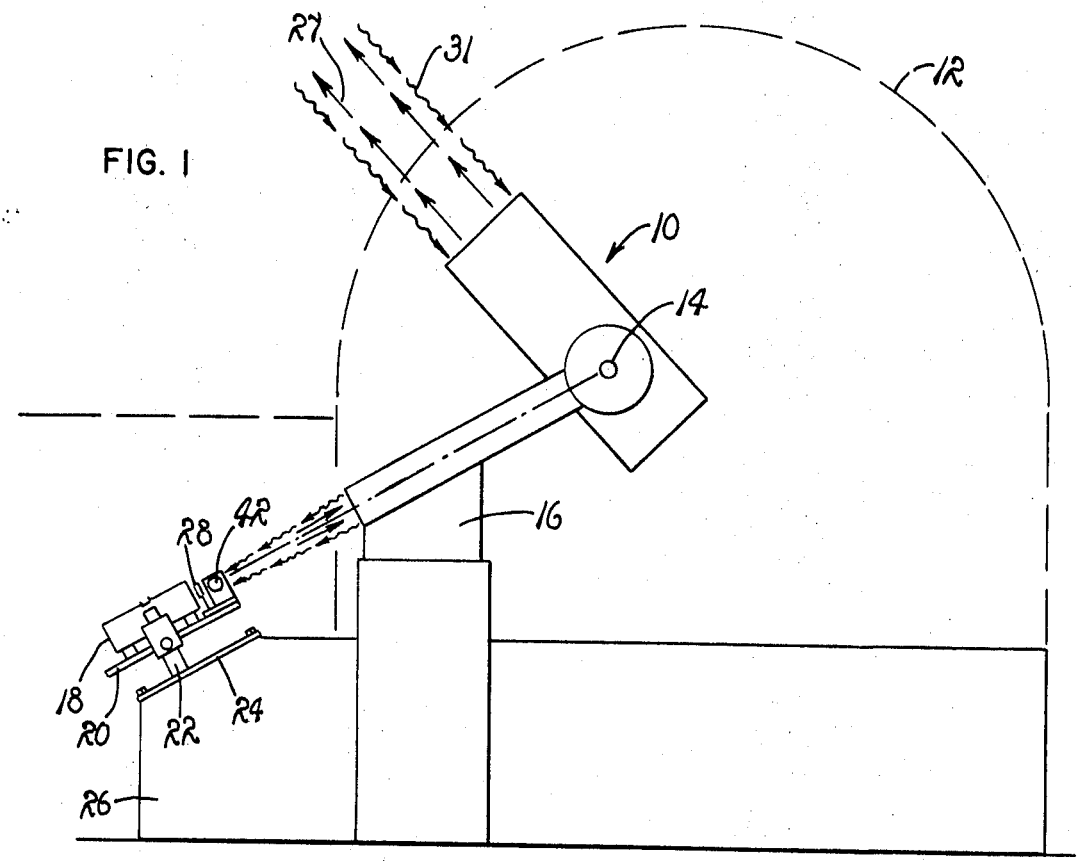
FIG. 1 is a diagrammatic elevation, not to scale, illustrating one environment in which the method and apparatus of the instant invention is employed.

Turning now to FIG. 1, a coudé telescope 10 is illustrated in an operative environment mounted within a convenient dome 12 having means including supports 14 for supporting the telescope for rotation about its axis of declination and a support 16 for supporting the telescope for rotation about its optical axis, whereby an optical tracking of a body in celestial space may be achieved by rotating the telescope about its axes.

While the method and apparatus embodying the principles of the present invention are particularly useful in conjunction with the operation of a coudé telescope, employed as a laser beam projector, it is to be understood that the method and apparatus may be employed with various types of optical systems for assuring an attainment of a desired system alignment in the tracking of celestial targets. However, since the coudé telescope has been found to be particularly useful in tracking celestial bodies and for simultaneously directing a beam of laser light to impinge at a selected point on the bodies, the description of the present invention includes a description of its employment with such a telescope.

At the output of the telescope 10, along the optical axis thereof, there is positioned a laser generator 18. The laser generator is mounted by any convenient means including a mounting plate 20 supported by a three-axis pedestal 22, of a type commonly called a three-axis television camera pedestal. The pedestal 22 is of a design which includes support means for supporting the plate 20 for rotation about three intersecting orthogonal axes. The pedestal, in turn, is supported through a base plate 24 secured to a suitable mount 26 of a design and construction adapted to rigidly support the pedestal in an operative disposition.

In practice, the laser generator 18 is of a type frequently referred to as a water-cooled, argon laser generator. Therefore, the generator is provided with water cooling means, not designated, for cooling the laser in any suitable fashion. In practice, the generator is mounted on the support plate 20 in a manner such that its output beam 27 is directed along the optical axis of the associated telescope 10.

Figure 2:
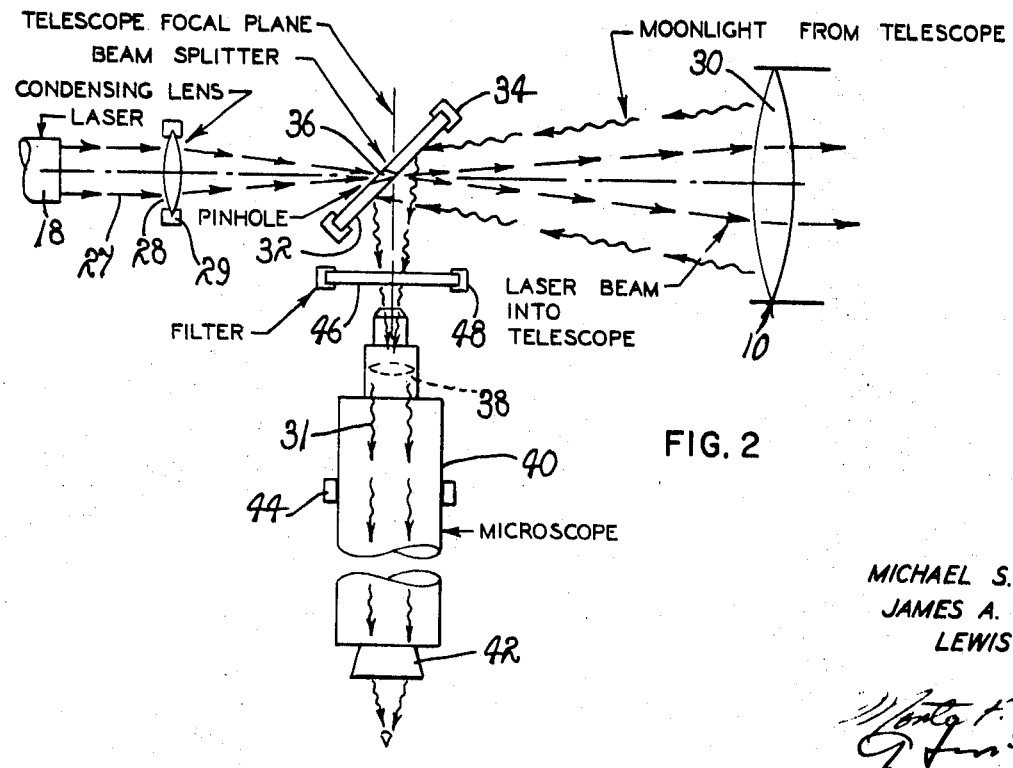
FIG. 2 is a diagram illustrating the apparatus employed in performing the method of the instant invention.

In order to properly match the output of the laser with the secondary optic system of the coudé telescope, there is provided a condensing lens 28, mounted in a bracket 29, and operatively supported between the secondary optics of the telescope and the output of the laser. As a practical matter, the condensing lens 28 is a convex lens of a type such that the focal ratio of the converging beam almost matches the focal ratio of the coudé focus of the telescope 10. The lens 28, as best illustrated in FIG. 2, is so located that the point at which the laser beam is focused is located along the optical axis and in the focal plane of the output lens 30 of the telescope 10. Consequently, it can be appreciated that, in practice, the telescope also is employed for recollimating the focused laser beam 27 as it directs the beam toward a selected celestial target.

In employing the telescope 10 for simultaneously tracking and projecting a laser beam toward the target, the telescope is employed in the usual manner by selectively effecting rotation of the telescope's optic system about its axes in order to continuously aim or align the telescope relative to a given target in a manner such that the light 31 emanating from the target is accepted and focused at the output of the telescope 10. However, in order to achieve the desired alignment, a beam splitter 32 is mounted to extend through the focal plane, transversely of the laser beam as it is directed toward the telescope, as well as the light emanating from the target through the output of the telescope.

In practice, the beam splitter 32 is formed by providing a suitable aluminized reflective surface to reflect and thus redirect the light 31 emanating from the target along a divergent path. The beam splitter is mounted by a suitable bracket 34 in a manner such that it is caused to extend at a 45° angle relative to the optical axis of the telescope 10.

Within the center portion of the beam splitter there is provided a microscopic opening 36. This opening is ultrasonically drilled at an angle of 45° relative to the reflecting surface so that the opening may be disposed in concentric alignment relative to the optical axis of the telescope. In practice, the opening has a diameter of approximately 200 micromillimeters. The purpose of the opening 36 is to accommodate a passage of the focused laser beam 27 as it is directed toward the output lens 30 of the telescope 10 so that the light 31 emanating from the target may be directed along a path extending orthogonally from the optical axis of the telescope 10, while the projection of the laser beam 27 along the optical axis is accommodated. Hence, the size of the opening 36 is such that it neither interferes with the laser beam nor obliterates a significant portion of the surface of a target during tracking operations.

As the light 31 is redirected by the beam splitter 32, it is caused to impinge upon the input lens 38 of a second optic system 40. In practice, the second optic system 40 comprises a compound telescope having a suitable eyepiece 42 which serves as a means for accommodating the visual observation of the light emanating from the target. This second optic system also is supported by a suitable bracket 44 and in a manner such that the position operatively established between the beam splitter 32 and the microscope is fixed. Consequently, the microscope continuously is directed toward the opening 36 formed in the reflecting surface of the beam splitter 32.

As a practical matter, the optical alignment established between the laser 18, the opening 36 of the beam splitter 32, and the microscope 40 may be varied as required, since each of these devices is independently mounted on the base support 22 in a manner such that relative positioning thereof may readily be achieved.

In practice, an observer visually observing the beam splitter 32 will encounter a certain amount of laser light backscatter, therefore, a suitable filter 46 is provided and mounted in suitable brackets 48. The filter operatively is interposed between the beam splitter and the microscope 40 at a location suitable for filtering laser light from the light directed toward the eyepiece 42 of the microscope 40 and thereby serves as a safety device for protecting the eyes of the observer.

OPERATION

It is believed that in view of the foregoing description, the operation of the device will be readily understood and it will be briefly reviewed at this point. In operation, the position of the laser generator 18 is adjusted so that the laser beam 27 is directed along the optical axis of the generator. As a practical matter, the generator also is adjusted to optimize the intensity distribution of its output. With the lens 28 and the beam splitter 32 removed from the system, the laser beam is directed along the optical axis of the coudé secondary optic system of the telescope 10. By employing the various axes of the pedestal 22, it is possible to position the laser generator so that the projected beam is symmetric about the optical axis, while the light 31 returning from a given target, as directed by the coudé secondary optic system, is symmetric about the laser beam. When such a condition exists, the shadow of the optical axis cross wire of the coudé secondary optic system will appear at the output end plate of the laser generator and, when the system is properly aligned, will coincide with the illuminated area formed by the laser output beam at the generator's end plate.

The condensing lens 28 is then inserted in the bracket 29 and adjusted in a manner such that the aperture of the telescope 10 is uniformly illuminated. This may be achieved by directing the telescope in a manner such that the laser beam 27 is caused to impinge to form a spot on the inside of the dome 12.

The beam splitter 32 is now positioned in the bracket 34 in a manner such that it extends through the focal plane of the output derived from the coudé secondary optic system. The position of the condensing lens 28 is adjusted so that the laser beam 27 is focused at a point lying in the center of the opening 36, whereby the beam 27 is caused to pass through the opening 36 in an unobstructed manner and permitted to impinge on the lens 30 of the telescope 10. The positioning of the lens 28 and the beam splitter 32 is so adjusted so that the laser beam is caused to uniformly fill the telescope aperture.

With the system thus aligned, the telescope 10 is pointed toward a selected celestial target with the collimated beam 27 of laser light being projected from the telescope, while the light 31 emanating from the target is brought in focus and reflected by the beam splitter 32 to the second optic system 40 where alignment is visually confirmed. The telescope operatively is guided so that the image of the selected target is brought into a concentric relationship with the image of the opening 36, as viewed by an observer looking through the eyepiece 42 of the system 40. Upon achieving symmetry between the opening through which the laser beam is passed and the image of the target provided by the output of the telescope, alignment of the system is confirmed and proper direction of the beam 27 is assured. By continuously and visually observing the position of the image of the target relative to the opening through which the laser beam is projected, continuous alignment for a laser beam projector relative to the target is achievable.

Hence, in view of the foregoing, it should be appreciated that the method and apparatus embodying the present invention provides a simplified solution to the complex problem of aligning laser beam projectors, particularly projectors of a type which employ optical systems commonly employed in examining celestial space.

Although the invention has been herein shown and described in what is conceived to be the most practical and preferred method and apparatus, it is recognized that departures may be made therefrom within the scope of the invention.

We claim:

1. In a method for aligning with a selected target a laser beam projector of a type adapted to track a target, the steps of:

directing a collimated beam of laser light toward a first focal plane from a source of laser light;

focusing said collimated beam of laser light at a focal point located in said focal plane;

collecting light rays emanating from a selected target and imaging the target in said first focal plane so that the target image assumes a concentric relationship relative to said focal point;

deflecting the target image from said focal plane along a given path by means including a reflective surface having an opening coincident with said focal point, throughwhich the rays of the focused laser beam are projected to the target;

viewing along said given path the deflected target image and the opening; and maintaining said target image and opening in a concentric symmetric relationship.

2. The method according to claim 1 wherein the focused rays of the laser beam are recollimated and directed toward the target.

3. An apparatus for use in aligning with a selected target a laser beam projector of the type adapted to track a light ray emanating target comprising:

a first optic system having an optical axis and including therein a mirror and lens system for collecting light rays emanating from a selected target and focusing the rays for imaging the target in a first focal plane concentric with said axis;

a laser generator mounted in coaxial relationship with said first optic system and displaced therefrom with the first focal plane being disposed therebetween;

a condensing lens disposed between the generator and the first focal plane for focusing the laser beam at a point located along the optical axis and within said focal plane;

a beam splitter disposed within the first focal plane including a reflecting surface arranged to intercept and to deflect light rays emanating from the target along a given path and including means defining therein an axial opening for accommodating passage of the focused laser beam for subsequent impingement on the surface of the mirror and lens system of the first optic system; and a second optic system disposed in said given path including means for achieving a symmetric imaging of the target and the means defining the axial opening in said reflecting surface, whereby the position of the first optic system relative to the target may be varied so that the image of the axial opening and the image of the target may be brought into symmetric registry for thereby establishing and maintaining coaxial alignment between the first optic system and the generator so that the focused laser beam may be caused to pass through the first optic system for subsequent impingement on the target.

4. The apparatus according to claim 3 wherein the first optic system comprises an astronomical telescope and the second optic system comprises a compound microscope.

5. The apparatus according to claim 4 further including an optic filter disposed between the beam splitter and the second optic system for inhibiting the passage of laser light backscatter through said second optic system.